United States Patent
Shang et al.

(10) Patent No.: US 8,827,630 B2
(45) Date of Patent: *Sep. 9, 2014

(54) METHOD AND SYSTEM FOR DETERMINING GAS TURBINE TIP CLEARANCE

(71) Applicant: Kulite Semiconductor Products, Inc., Leonia, NJ (US)

(72) Inventors: Tonghuo Shang, East Lyme, CT (US); Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,791

(22) Filed: Dec. 3, 2012

(65) Prior Publication Data
US 2013/0091940 A1   Apr. 18, 2013

Related U.S. Application Data

(63) Continuation of application No. 13/084,822, filed on Apr. 12, 2011, now Pat. No. 8,322,973, which is a continuation of application No. 12/387,078, filed on Apr. 28, 2009, now Pat. No. 7,922,441, which is a continuation of application No. 11/063,205, filed on Feb. 22, 2005, now Pat. No. 7,540,704.

(60) Provisional application No. 60/582,289, filed on Jun. 23, 2004.

(51) Int. Cl.
*F01D 25/00*   (2006.01)

(52) U.S. Cl.
USPC .............................................. 415/1; 415/118

(58) Field of Classification Search
USPC ....................................................... 415/173.2
See application file for complete search history.

(56) References Cited

U.S. PATENT DOCUMENTS

| | | | | |
|---|---|---|---|---|
| 3,754,433 A | * | 8/1973 | Hyer | 73/37.6 |
| 4,326,804 A | * | 4/1982 | Mossey | 356/623 |
| 4,971,517 A | * | 11/1990 | Perkey et al. | 415/14 |
| 5,119,036 A | * | 6/1992 | Rickards et al. | 324/662 |
| 5,612,497 A | * | 3/1997 | Walter et al. | 73/756 |
| 2003/0007860 A1 | * | 1/2003 | Nakajima et al. | 415/1 |

FOREIGN PATENT DOCUMENTS

SU   1302139 A   *   4/1987

* cited by examiner

*Primary Examiner* — Richard Edgar
(74) *Attorney, Agent, or Firm* — Troutman Sanders LLP; James E. Schutz

(57) ABSTRACT

A system for sensing at least one physical characteristic associated with an engine including a turbine having a plurality of blades turning inside a casing, the system including: a pressure sensor coupled substantially adjacent to the casing and including at least one output; a port in the turbine casing for communicating a pressure indicative of a clearance between the blades and casing to the pressure sensor; a cooling cavity substantially surrounding the pressure sensor; and, an inlet for receiving fluid from the engine and feeding the fluid to the cooling cavity to cool the pressure sensor; wherein, the pressure sensor output is indicative of the clearance between the blades and casing.

21 Claims, 1 Drawing Sheet

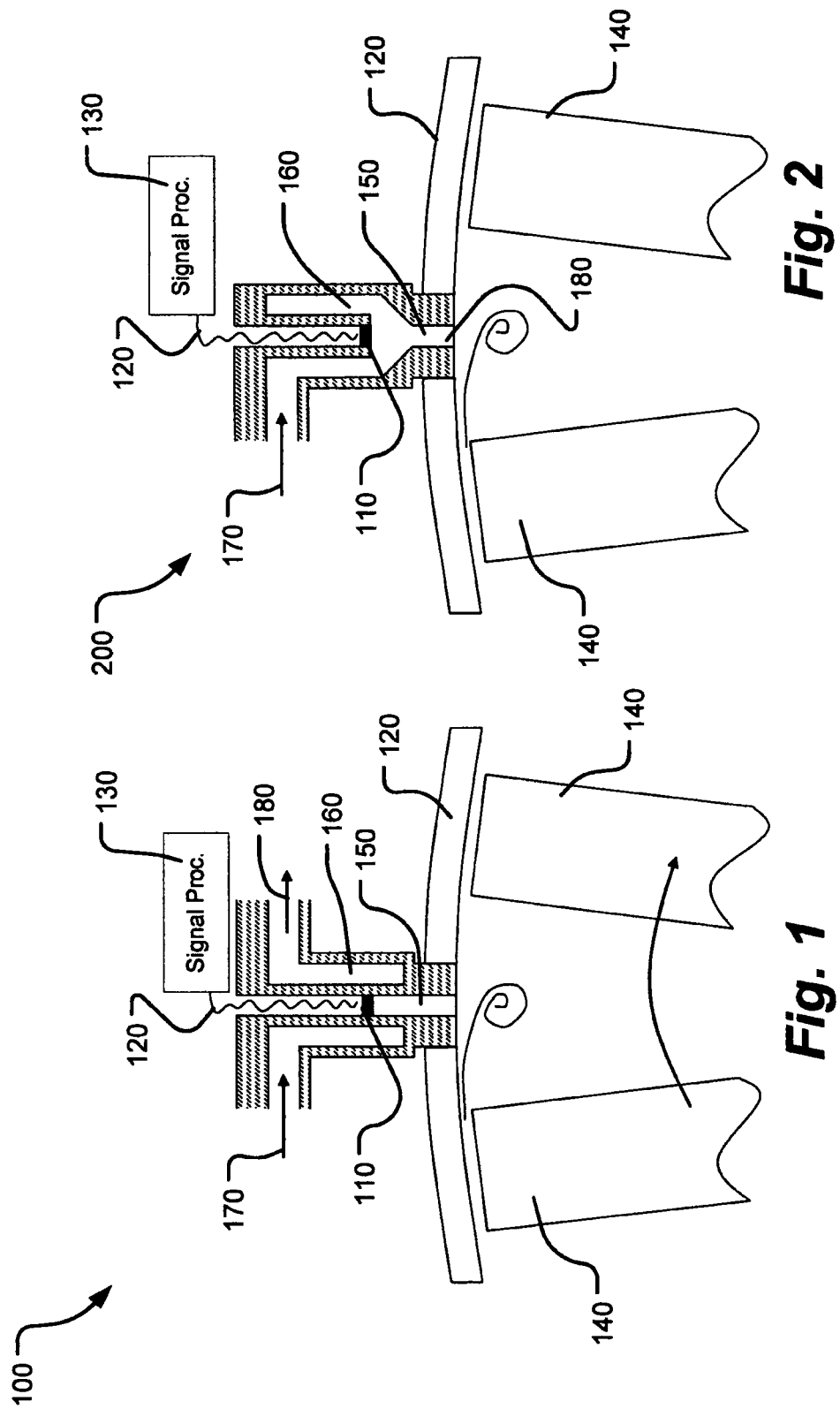

METHOD AND SYSTEM FOR DETERMINING GAS TURBINE TIP CLEARANCE

CROSS-REFERENCE TO RELATED APPLICATIONS

This application is a continuation of U.S. patent application Ser. No. 13/084,822, filed 12 Apr. 2011, which is a continuation application of U.S. patent application Ser. No. 12/387,078, filed 28 Apr. 2009, which was a continuation application of U.S. patent application Ser. No. 11/063,205, filed 22 Feb. 2005, now U.S. Pat. No. 7,540,704, which issued on 2 Jun. 2009, which claimed priority to U.S. Provisional Patent Application No. 60/582,289, filed 23 Jun. 2004, the entire disclosures are hereby incorporated by reference in their entirety herein.

FIELD OF THE INVENTION

The invention relates generally to gas turbine engines and their operation, and more particularly to gas turbine engine tip clearance measurement systems.

BACKGROUND OF THE INVENTION

It is well known that tip clearance leakage is one of the primary loss mechanisms in axial flow compressors and turbines of a gas turbine engine. Tip clearance loss translates into lost efficiency, higher fuel costs and thus higher operating costs. More particularly, over the operating life of an engine such as an aircraft engine, tip clearance increases over time, due at least in part to mechanical rubs between rotating blades and stationary casing and erosion. This clearance deterioration is a leading driver for engine performance deterioration, which often manifests in increased fuel burn and exhaust gas temperatures (EGT). The FAA mandates that an engine be removed for maintenance/overhaul once the EGT reaches an upper limit.

It is desirable therefore to maintain tip clearance as low as possible in an effort to minimize related losses throughout the engine-operating envelope. One way of achieving this is to use Active tip Clearance Control (ACC) systems, such that clearance levels are adjusted for engine operating conditions, and throughout the operating cycle. For any ACC concept to work effectively, real-time tip clearance data is required as part of the control algorithm. However, current tip clearance sensors are believed to be deficient in certain regards.

Accordingly, an alternative tip clearance measurement technique and system for accomplishing tip clearance measurement is highly desirable.

SUMMARY OF THE INVENTION

A system for sensing at least one physical characteristic associated with an engine including a turbine having a plurality of blades turning inside a casing, the system including: a pressure sensor coupled substantially adjacent to the casing and including at least one output; a port in the turbine casing for communicating a pressure indicative of a clearance between the blades and casing to the pressure sensor; a cooling cavity substantially surrounding the pressure sensor; and, an inlet for receiving a fluid such as compressed air from the engine and feeding the compressed air to the cooling cavity to cool the pressure sensor; wherein, the pressure sensor output is indicative of the clearance between the blades and casing.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and:

FIG. 1 illustrates gas turbine tip clearance sensor system according to an aspect of the present invention; and, FIG. 2 illustrates gas turbine tip clearance sensor system according to an aspect of the present invention.

DETAILED DESCRIPTION OF THE PREFERRED EMBODIMENTS

It is to be understood that the figures and descriptions of the present invention have been simplified to illustrate elements that are relevant for a clear understanding, while eliminating, for the purpose of clarity, many other elements found in typical gas turbine engines and methods of making and using the same, and pressure sensing systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

FIG. 1 illustrates a schematic cross section of an exemplary turbine system 100 including a pressure transducer 110 mounted substantially adjacent to, including for example, within the interior of, turbine case 120. Transducer 110 measures pressure on the turbine case 120, and provides a signal indicative of the sensed pressure via leads (not shown) electrically coupled thereto.

Turbine system 100 may include an engine assembly that takes the form of a conventional gas turbine engine. In operation, blades 140 of engine 100 rotate past port 150 which communicates the pressure at the turbine casing 120 to transducer 110. As a result of blade rotation, the pressure sensed by transducer 110 varies. As a blade passes and obscures port 150, the inlet of port 150 is essentially closed and the pressure communicated to transducer 110 is essentially the ambient static pressure. The inlet to port 150 becomes un-obscured after the blade passes. At this point, the communicated and sensed pressure rises to a maximum pressure indicative of blade 140 loading. This cyclic process repeats as each of the turbine blades 140 passes port 150.

As is understood, tip clearance size affects the blade loading. This is due to leakage flows from one side of the blade to the other across the clearance gap. Hence, the unsteady pressure field exerted upon port 150 is a function of tip clearance size. The functional dependence between the two tip clearance and the pressure signature as measured by the transducer may be established through computer modeling and/or calibration testing, for example. Thus, one may derive real-time tip clearance data from sensing the unsteady pressure signature resulting from turbine blades passing by a case mounted pressure transducer.

As will be understood by those possessing an ordinary skill in the pertinent arts, pressure transducer 110 may have a frequency response capability roughly 5-10 times that of the blade passing frequency in order to resolve the flow structure at the blade tip region. For example, the blade passing frequency for a high-pressure turbine in a typical modern gas turbine engine may be around ten kilohertz (10 KHz). Accordingly, transducer 110 may have a frequency response on the order of about 50 KHz-100 KHz. Such high frequency operation may require transducer 110 to be mounted close to turbine casing 120—as a physically extending port 150 may serve to essentially low-pass filter the pressure signature resulting from turbine blades 140 passing port 150.

The output of pressure transducer 110 may optionally be provided to a signal processing and conditioning electronics module 130 remotely located within the system 100. Sensor 110 and/or signal processor 130 may provide one or more signals indicative of an operating condition of the engine assembly 100, such as turbine tip clearance.

Signal processing and conditioning electronics module 130 may include a processor and memory, by way of example only. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary "Memory", as used herein, refers to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. The memory utilized by the processor may be internal or external to an integrated unit including the processor. For example, in the case of a microprocessor, the memory may be internal or external to the microprocessor itself. Of course, module 130 may take other forms as well, such as an electronic interface or Application Specific Integrated Circuit (ASIC).

As is well understood by those possessing an ordinary skill in the pertinent arts, in general an axial flow turbine engine includes a compressor, combustion area and turbine. In compressor applications, the casing temperature is at or below 1300 degrees Fahrenheit (1300° F.). In the turbine section, the metal temperature can reach as high as 2500° F. According to an aspect of the present invention, transducer cooling may used. According to another aspect of the present invention, pressure transducers for turbine clearance measurement may be air cooled, optionally using the same cooling air that may be used to cool the turbine casing.

Referring still to FIG. 1, there is shown a cooling chamber 160 substantially surrounding transducer 110 and having a cooling air inlet 170 and outlet 180. Cooling air for inlet 170 may be drawn from a compressor of turbine system 100, and thus have a temperature around 1300° F., for example. The cooling air may circulate through chamber 160, cooling transducer 110 and/or the immediate environment it is subjected to, and then exit outlet 180. A high temperature pressure transducer, such as model WCT-250 or WCT-312 cooled by air of water pressure sensor, commercially available from Kulite Semiconductor Products, Inc. the assignee hereof, may be used in combination with such a cooling scheme to provide a system that can reliably operate in a high temperature, high pressure turbine environment.

Referring now to FIG. 2, there is shown a turbine system 200 according to an aspect of the present invention. Like references have been used in FIGS. 1 and 2 to designate like elements of the invention. Hence, a detailed discussion of those common elements will not be repeated. In system 200, cooling air is again fed into a chamber 160 substantially surrounding pressure transducer 110 via inlet 170. The cooling air is again discharged using an outlet 180. However, outlet 180 of system 200 discharges spent cooling air into the main gas path, i.e., into the turbine. Outlet 180 may discharge into port 150, such that pressure sensing port 150 of system 200 will have a net air outflow, forming a discharge jet into the turbine. This allows an interaction between the discharge jet and the passing turbine blades 140. This interaction may enhance the sensing of the unsteady pressure as a function of tip clearance size. Parameters, such as discharge jet velocity and flow rate of the cooling chamber, inlet and outlet may be chosen to maximize the sensitivity of the sensed unsteady pressure signal as a function of tip clearance.

By way of further, non-limiting example only, the cooling airflow in FIG. 2 is modulated by the relative motion of turbine blades or airfoils. The cooling air is first modulated by the interaction between the cooling air and unsteady pressure field around each turbine blade. The unsteady pressure fluctuations will modulate cooling airflow rate, therefore affecting air pressure measured by the pressure sensor. The cooling air is also modulated by the interaction with the turbine blades themselves. When the turbine blades periodically pass over the cooling air discharge jet, a blockage effect occurs when the turbine blade is aligned with the discharge jet, whereas no or little blockage is present without such an alignment. This on and off blockage effect modulates the cooling airflow rate, again impacting unsteady pressure measurements. The amount of blockage, and the resultant pressure fluctuations, will depend on blade geometry and tip clearance size. As blade geometry is known, tip clearance may be deduced.

According to an aspect of the present invention, by sizing the cooling air discharge and cooling chamber geometries, one may "acoustically tune" the effect on transducer 110 so as to maximize pressure fluctuations due to tip clearance changes, thus increasing tip clearance measurement accuracy.

According to an aspect of the present invention, transducer 110 may also be utilized to measure turbine rotational speed. Transducer 110 senses the turbine blade passing frequency, by sensing the unsteady pressure field generated each time a turbine blade 140 passes port 150. Using this frequency, together with the known configuration of the turbine itself, such as the number of blades installed on the turbine wheel, one may readily deduce turbine shaft speed. Such a shaft speed sensor may prove more reliable, and physically lighter than conventional magnetic speed transducers. Further, as a same transducer may be used to provide multiple functionality according to an aspect of the present invention, additional cost savings to the engine system as a whole may be realized.

According to an aspect of the present invention, tip clearance may be adjusted using a conventional methodology responsively to the output of the pressure transducer.

Those of ordinary skill in the art may recognize that many modifications and variations of the present invention may be implemented without departing from the spirit or scope of the invention.

The invention claimed is:

1. A system, comprising:
    a pressure transducer disposed in a port defined by a turbine casing, wherein the pressure transducer is configured to:
        receive a first pressure while a first blade rotating inside the turbine casing obscures the port;
        measure the first pressure to determine a first pressure signal;
        output the first pressure signal;
        receive a second pressure while the first blade does not obscure the port;
        measure the second pressure to determine a second pressure signal; and
        output the second pressure signal; and wherein the first pressure signal and the second pressure signal are used to determine a first clearance between the first blade and the turbine casing.

2. The system of claim 1, further comprising:
a processor operationally coupled to the pressure transducer, wherein the processor is configured to:
receive, from the pressure transducer, the first pressure signal and the second pressure signal; and
wherein the pressure transducer, is further configured to:
output, to the processor, the first pressure signal and the second pressure signal.

3. The system of claim 2, wherein the pressure transducer is further configured to:
receive a third pressure while a second blade rotating inside the turbine casing obscures the port;
measure the third pressure to determine a third pressure signal;
output, to the processor, the third pressure signal;
receive a fourth pressure while the first blade does not obscure the port;
measure the fourth pressure to determine a fourth pressure signal; and
output, to the processor, the fourth pressure signal; and
wherein the processor is further configured to:
receive, from the pressure transducer, the third pressure signal and the fourth pressure signal;
determine a second clearance between the second blade and the turbine casing using the third pressure signal and the fourth pressure signal; and
compare the first clearance and the second clearance.

4. The system of claim 2, wherein the processor is further configured to:
determine the first clearance between the first blade and the turbine casing using the first pressure and the second pressure.

5. The system of claim 2, wherein the processor is further configured to:
determine a turbine rotational speed using the first pressure and the second pressure.

6. The system of claim 1, further comprising:
a cavity disposed around the pressure transducer, wherein the cavity is configured to:
receive a fluid;
circulate the fluid in the cavity to generate a circulated fluid, wherein the fluid is used to moderate a temperature of the pressure transducer; and
output the circulated fluid.

7. The system of claim 6, wherein the fluid is air.

8. The system of claim 6, further comprising:
an inlet operationally coupled to the cavity, wherein the inlet is configured to:
receive the fluid; and
output, to the cavity, the fluid; and
wherein the cavity is further configured to:
receive, from the inlet, the fluid.

9. The system of claim 8, wherein the inlet is further configured:
receive, from the cavity, the circulated fluid; and
output the circulated fluid.

10. The system of claim 8, further comprising:
an outlet operationally coupled to the cavity, wherein the outlet is configured to:
receive, from the cavity, the circulated fluid; and
output the circulated fluid.

11. A method, comprising:
receiving, at a pressure transducer, a first pressure while a first blade rotating inside a turbine casing obscures a port;
measuring the first pressure to generate a first pressure signal;
outputting, by the pressure transducer, the first pressure signal;
receiving, at the pressure transducer, a second pressure while the first blade does not obscure the port;
measuring the second pressure to generate a second pressure signal;
outputting, by the pressure transducer, the second pressure signal; and
wherein the first pressure signal and the second pressure signal are used to determine a first clearance between the first blade and the turbine casing.

12. The method of claim 11, further comprising:
receiving, by a processor operationally coupled to the pressure transducer, the first pressure signal and the second pressure signal; and
determining, by the processor, a turbine rotational speed using the first pressure and the second pressure.

13. The method of claim 11, further comprising:
receiving, by a processor operationally coupled to the pressure transducer, the first pressure signal and the second pressure signal; and
determining, by the processor, a first clearance between the first blade and the turbine casing using the first pressure and the second pressure.

14. The method of claim 13, further comprising:
receiving, at the pressure transducer, a third pressure while a second blade rotating inside the turbine casing obscures the port;
measuring the third pressure to generate a third pressure signal;
outputting, by the pressure sensor, the third pressure signal;
receiving, at the pressure sensor, a fourth pressure while the second blade does not obscure the port;
measuring the fourth pressure to generate a fourth pressure signal;
outputting, by the pressure sensor, the fourth pressure signal; and
wherein the third pressure signal and the fourth pressure signal are used to determine a second clearance between the second blade and the turbine casing.

15. The method of claim 14, further comprising:
comparing, by the processor, the first clearance and the second clearance.

16. The method of claim 11, further comprising:
moderating, by a cavity disposed around the pressure transducer, a temperature of the pressure transducer.

17. The method of claim 16, wherein moderating the temperature of the pressure transducer includes:
receiving, at the cavity, a fluid;
circulating the fluid in the cavity to generate a circulated fluid; and
outputting, from the cavity, the circulated fluid.

18. A non-transitory computer-readable medium encoded with a computer program, the computer program comprising instructions that when executed by a processor causes the processor to perform operations, wherein the operations are configured to:
receive, from a pressure transducer, a first pressure signal associated with a first pressure measured while a first blade rotating inside a turbine casing obscures a port;

receive, from the pressure transducer, a second pressure signal associated with a second pressure measured while the first blade does not obscure the port; and determine a first clearance between the first blade and the turbine casing using the first pressure signal and the second pressure signal.

19. The computer-readable medium of claim 18, wherein the operations are further configured to:

determine a turbine rotational speed using the first pressure and the second pressure.

20. The computer-readable medium of claim 18, wherein the operations are further configured to:

determine a difference between the first pressure and the second pressure; and determine a first clearance between the first blade and the turbine using the difference between the first pressure and the second pressure.

21. The computer-readable medium of claim 18, wherein the operations are further configured to:

receive, from the pressure transducer, a third pressure signal associated with a third pressure measured while the second blade rotating inside the turbine casing obscures the port;

receive, from the pressure transducer, a fourth pressure signal associated with a fourth pressure measured while the second blade does not obscure the port;

determine a second clearance between the second blade and the turbine casing; and compare the first clearance and the second clearance.

* * * * *